June 29, 1937.  C. G. KOLSTEDT  2,085,319

CLOTHESLINE FASTENER

Filed Nov. 9, 1936

INVENTOR
CARL G. KOLSTEDT

BY Adam E. Fisher
ATTORNEY

Patented June 29, 1937

2,085,319

UNITED STATES PATENT OFFICE 2,085,319

CLOTHESLINE FASTENER

Carl G. Kolstedt, Frankfort, Ill.

Application November 9, 1936, Serial No. 109,891

3 Claims. (Cl. 188—65.2)

My invention relates to improvements in clothesline fasteners and the main object is to provide a simple and inexpensive device through which the clothesline may be run and fastened tightly to prevent its sagging.

Another object is to provide a fastener including a bearing arm and swivel for pivotally mounting the same to a support and the said arm carrying side plates between which a pulley is journaled so that the clothesline may be run thereon and down alongside the bearing arm, and there being a pressure or clamp block arranged adjacent to said bearing arm in such manner as to press the clothesline tightly against the arm when the line is pulled taut over the pulley.

A further object is to provide a guide member attached to the said pressure block and having an extended tongue which lies in the groove of the pulley and serves to guide the clothesline down between the bearing arm and pressure block.

With these and other objects in view the invention resides in the novel construction and arrangement of parts as hereinafter fully set forth and claimed, reference being had to the accompanying drawing as showing a preferred embodiment of my invention for purposes of exemplification.

Figure 1:
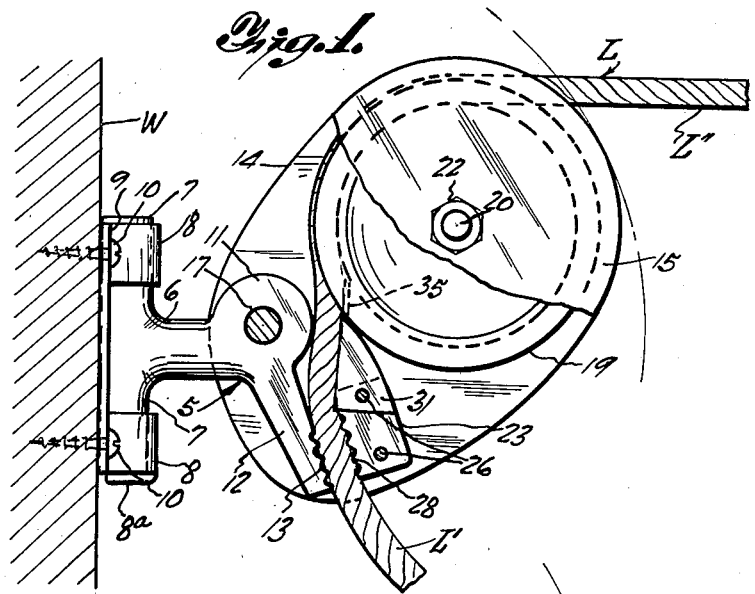
Figure 1 is a side elevation of my fastener in use, one side plate being partially broken away to disclose the interior construction.
Figure 2:
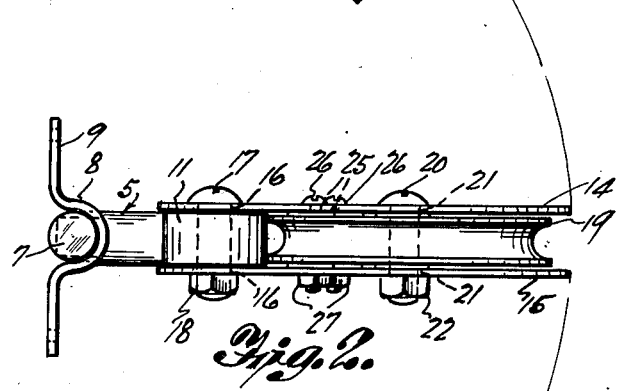
Figure 2 is a plan view.
Figure 3:
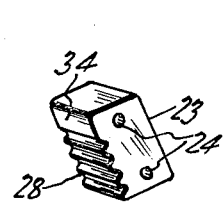
Figure 3 is a perspective view of the pressure block alone.
Figure 4:
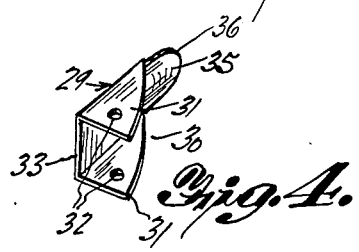
Figure 4 is a perspective view of the guide member alone.

In carrying out my invention I provide a bearing arm 5 comprising a T-shaped mounting portion having a shank 6 and the head or bearing pins 7. These pins 7 are swiveled in loops 8 formed in a metal bracket 9 which may be secured by screws 10 to the wall W or any other suitable support. An ear 8a turned inward from the lower loop 8 supports the lower pin 7. Thus the arm 5 as a whole may swing about the bracket 9 in a horizontal plane as will be understood. The outer end of the shank 6 has an apertured bearing eye 11 and a clamp finger or prong 12 is extended angularly downwardly and forwardly from the eye, the outer or frontal face of this finger being toothed or serrated as indicated at 13.

Side plates 14 and 15 of flat ovate form are provided and are apertured near one end as at 16 to receive a pivot bolt 17 which is passed through these apertures and through the aforesaid eye 11 thus pivotally mounting the side plates in spaced relation one on each side of the arm 5. The pivot bolt 17 is held in place by a nut 18 screwed on its end. A large pulley 19 is journaled on a bolt 20 which is passed through apertures 21 in the side plates 14 and 15, the pulley being located between the opposite or free end portions of the side plates and clearing the eye 11 by a space sufficient to pass the clothesline L which is passed down over the pulley between the side plates and along the clamp finger 12 as shown. The bolt 20 is also secured by a nut 22.

A pressure or clamp block 23 of rectangular shape is mounted between the side plates 14 and 15 outwardly a short distance from the serrated face 13 of the clamp finger 12 and parallel thereto, this block having spaced apertures 24 registering with apertures 25 in the side plates for the reception of bolts 26 by which the block is rigidly mounted in this position. The bolts 26 are held in place by nuts 27.

The rear or inner face of the pressure block 23 adjacent the finger 12 is also toothed or serrated as shown at 28 and the clothesline L is passed downward at its end between the serrated faces of the finger and block. Then by pulling on the end L' of the clothesline the reach or length L'' of the line may be pulled taut, running over the pulley 19 as it does so. The outward pull or strain of the taut line then pulls outward on the upper portion of the side plates and pulley and moving this assembly as a whole downwardly causes the pressure block 23 to move against the clamp finger 12 and tightly grip the line end L' as will be evident. Thus the clothesline will be held in the desired tight condition.

To facilitate the entrance or threading of the line end L' down between the finger 12 and block 23 and prevent its following around the pulley above the block I provide a guide member 29 made up of thin sheet metal including a U-shaped mounting portion 30 the sides 31 of which are adapted to straddle or embrace the pressure block 23 at its upper extremity. These sides 31 have aligned apertures 32 to pass one of the block mounting bolts 26 by which the guide member is mounted. The bight 33 of the guide member then rests against the upper portion 34 of the rear or inner face of the pressure block 23 and the bight is extended in the form of a guide or "pick-up" ear or lug 35 which is extended into the groove of the pulley 19. The extremity of the ear 35 is rounded as shown at 36 to fit the groove of the pulley nicely and the ear is concavo-convex in cross section so as to present a concaved face to the clothesline L as it passes and to provide a greater clearance for the line. It will be evident that the ear 35 will absolutely prevent the line L from working past the pressure block 23 and will guide it down alongside the same properly. The side plates 14 and 15 enclose the entire assembly to protect the working parts.

I claim:

1. In a device of the kind described, a swiveled arm including a bearing eye and pressure finger extended downwardly therefrom, side plates pivotally mounted adjacent one end at each side of the bearing eye, a grooved pulley journaled between the side plates and spaced outwardly and above the said bearing eye, and a pressure block mounted between the side plates below the pulley and parallel to the said pressure finger, the parallel adjacent faces of the pressure finger and pressure block being serrated.

2. In a device of the kind described, a swiveled arm including a bearing eye and pressure finger extended downwardly therefrom, side plates pivotally mounted adjacent one end at each side of the bearing eye, a grooved pulley journaled between the side plates and spaced outwardly and above the said bearing eye, a pressure block mounted between the side plates below the pulley and parallel to the said pressure finger, the parallel adjacent faces of the pressure finger and pressure block being serrated, and a guide member secured to the pressure block and including an ear extended upwardly into the groove of the said pulley.

3. In a device of the kind described, a swiveled arm including a bearing eye and pressure finger extended downwardly therefrom, side plates pivotally mounted adjacent one end at each side of the bearing eye, a grooved pulley journaled between the side plates and spaced outwardly and above the said bearing eye, a pressure block mounted between the side plates below the pulley and parallel to the said pressure finger, the parallel adjacent faces of the pressure finger and pressure block being serrated, a guide member secured to the pressure block and including an ear extended upwardly into the groove of the said pulley, the said guide member also including a U-shaped portion adapted to straddle the said pressure block, the bight of the said U-shaped portion being extended to form the said ear.

CARL G. KOLSTEDT.